United States Patent
Andersson et al.

(10) Patent No.: US 8,610,619 B2
(45) Date of Patent: Dec. 17, 2013

(54) VALIDITY CHECK OF VEHICLE POSITION INFORMATION

(75) Inventors: Svante Andersson, Norrköping (SE); Andreas Persson, Linköping (SE)

(73) Assignee: SAAB AB, Linköping (SE)

(*) Notice: Subject to any disclaimer, the term of this patent is extended or adjusted under 35 U.S.C. 154(b) by 444 days.

(21) Appl. No.: 13/000,122

(22) PCT Filed: Jun. 10, 2009

(86) PCT No.: PCT/SE2009/050701
§ 371 (c)(1),
(2), (4) Date: Mar. 25, 2011

(87) PCT Pub. No.: WO2009/154547
PCT Pub. Date: Dec. 23, 2009

(65) Prior Publication Data
US 2011/0163908 A1   Jul. 7, 2011

(30) Foreign Application Priority Data
Jun. 18, 2008   (EP) .................................... 08158503

(51) Int. Cl.
*G01S 13/74* (2006.01)
*G01S 5/02* (2010.01)
*G08G 5/00* (2006.01)
*G01S 13/93* (2006.01)

(52) U.S. Cl.
USPC ............................................. 342/36; 342/29

(58) Field of Classification Search
USPC ........................................................ 342/36
See application file for complete search history.

(56) References Cited

U.S. PATENT DOCUMENTS

| | | | | |
|---|---|---|---|---|
| 5,570,095 A | * | 10/1996 | Drouilhet et al. | 342/357.31 |
| 6,124,825 A | * | 9/2000 | Eschenbach | 342/357.31 |
| 6,681,158 B2 | * | 1/2004 | Griffith et al. | 701/3 |
| 6,952,631 B2 | * | 10/2005 | Griffith et al. | 701/13 |
| 7,116,266 B1 | | 10/2006 | Vesel et al. | |
| 7,777,675 B2 | * | 8/2010 | Smith et al. | 342/463 |
| 2007/0008108 A1 | * | 1/2007 | Schurig et al. | 340/539.11 |

FOREIGN PATENT DOCUMENTS

WO   WO-2006/040730 A   4/2006

OTHER PUBLICATIONS

PCT/ISA/210—International Search Report—Oct. 7, 2009.
PCT/ISA/237—Written Opinion of the International Searching Authority—Oct. 7, 2009.

(Continued)

*Primary Examiner* — Matthew M Barker
(74) *Attorney, Agent, or Firm* — Venable LLP

(57) ABSTRACT

A method for validating received positional data in vehicle surveillance applications wherein vehicles transmit positional data indicating their own position to surrounding vehicles. A a radio direction finding antenna arrangement of a receiving unit receives a signal carrying positional data indicating an alleged position of a vehicle, transmitted from a radio source. The bearing from the receiving unit to the radio source is estimated utilizing the radio direction finding antenna arrangement and the received signal. The distance between the receiving unit and the radio source is estimated based on the time of flight for a signal travelling there between at known speed. An estimated position of the radio source is calculated based on the estimated bearing and the estimated distance. A deviation value indicating the deviation/coincidence between the alleged position of a vehicle is determined according to the received positional data and the estimated position of the radio source.

12 Claims, 5 Drawing Sheets

(56) References Cited

OTHER PUBLICATIONS

Self-Organizing Time Division Mutiple Access VDL Mode 4—Standards and Recommended Practices, Appendix D of the Report on Agenda Item 5, Fourth Meeting of the Aeronautical Mobile Communications Panel (AMCP/4); Montreal, Mar. 25-Apr. 4, 1996.

R. P. Stead et al., Traffic Alert and Collision Avoidance System (TCAS) Transition Program (TTP): A Status Update; 1995, IEEE; pp. 135-139.

Spitzer, Cary R; Digital Avionics Handbook Second Edition; 21 TCAS II; Steve Henely; pp. 21-1-21-3; Paragraph 21.2.; 2007.

\* cited by examiner

VALIDITY CHECK OF VEHICLE POSITION INFORMATION

CROSS-REFERENCE TO RELATED APPLICATIONS

This application claims priority to European patent application 08158503.6 filed 18 Jun. 2008 and is the national phase of PCT/SE2009/0505701 filed 10 Jun. 2009.

TECHNICAL FIELD

The present invention relates to the field of traffic surveillance, and more particularly to a method for validating positional data allegedly indicating the position of a vehicle.

BACKGROUND ART

Traffic Surveillance and Traffic Management

Surveillance of air traffic is today managed by air traffic control (ATC) systems using primary and secondary radar. ATC systems currently under development use other or complementary techniques in the surveillance of air traffic. One such system is called automatic dependent surveillance-broadcast (ADS-B) which, on a long time scale, is expected to gradually replace current systems as a source for ATC information.

The basic idea of the ADS-B system is that all aircraft broadcast their own state vector, comprising position and status information, to all nearby aircraft and ground stations. Thus each aircraft has a complete picture of the surrounding traffic and the traffic close to a ground station can be monitored on ground.

Central to the ADS-B concept is the airborne data link (transponder) enabling the intended functionality. There are currently three different types of data links under consideration; Mode S ES, VDL Mode 4 and UAT.

Mode S ES is an extension of the conventional Mode S secondary surveillance radar system. VDL Mode 4 is a newly developed standard for a data link transponder compatible with ADS-B requirements. UAT is only considered for general aviation in the US.

Collision Avoidance and Separation Provision

Today, collision avoidance and separation provision is mechanized by air traffic controllers, pilots or the TCAS system. The basic feature in the TCAS system is the use of transponders and antennas. A very simplified explanation of the TCAS system is that it sends out a request from the transponder. If another aircraft is in the vicinity, an answer is sent back to the TCAS system which then knows the distance to the other aircraft (by measuring the time from the request to the received answer) and typically also in what direction the other aircraft is located (by using a directional antenna). The TCAS system then uses this information to issue warnings and suggested resolution manoeuvres if found necessary.

A drawback of today's TCAS systems is the uncertainties in the determined relative position (especially at large distances) due to the uncertainties in the directional antennas and the estimated distances to surrounding aircraft. These uncertainties may result in nuisance warnings from the system. The TCAS systems of today are therefore not considered to be suitable candidates for future collision avoidance and/or separation provision systems.

The ADS-B system and its possibility to automatically provide each aircraft with information relating to the surrounding traffic opens up for functionality such as automatic or semiautomatic separation provision and collision avoidance. These functions are particularly important in flight control of unmanned aerial vehicles (UAVs) but may also be important as a precautionary feature in piloted aircraft.

Considering the known shortcomings of TCAS, ADS-B seems a well suitable candidate for future systems for collision avoidance and separation provision using combinations of sensors such as, e.g., cameras, radar and ADS-B transponders. Aircraft-based aircraft surveillance systems for collision avoidance and separation provision are sometimes called Sense & Avoid systems.

Unfortunately, ADS-B systems of today suffer from a drawback. The position information received from surrounding air traffic has to be trusted to be correct. This is both a safety and security problem, safety in the sense that if the transmitting system emits an erroneous position it might cause a hazardous situation, and security in the sense that the system becomes prone to malicious use by emitting faked position reports.

For example, if an ADS-B message indicates an erroneous position of the aircraft from which it is transmitted, decisions made on the basis of that ADS-B message may have devastating consequences. An operator of an ATC system based on ADS-B data or a pilot/autopilot of an aircraft utilizing an ADS-B-based aircraft surveillance system, may be fooled to order/control an aircraft towards instead of away from the aircraft transmitting the erroneous ADS-B message.

SUMMARY

It is an object of the present invention to provide a vehicle surveillance system that is less prone to errors and less sensitive to malicious use.

This object is achieved by a method for validating positional data in vehicle surveillance applications wherein vehicles transmit positional data indicating their own position to surrounding vehicles, such as an ADS-B-based aircraft surveillance application. The method involves the steps of:
  receiving, with a radio direction finding antenna arrangement of a receiving unit, a signal carrying positional data indicating an alleged position of a vehicle, transmitted from a radio source;
  estimating the bearing from the receiving unit to said radio source utilizing said radio direction finding antenna arrangement and the received signal;
  estimating the distance between the receiving unit and the radio source based on the time of flight for a signal travelling there between at known speed;
  calculating an estimated position of the radio source based on the estimated bearing and the estimated distance, and
  determining a deviation value indicating the deviation/coincidence between the alleged position of a vehicle according to the received positional data and the estimated position of the radio source.

By estimating the bearing and the distance to a radio source transmitting positional data relating to an alleged position of a vehicle, and by calculating an estimated position for said radio source based on the estimated bearing and distance, the above method provides for a way of determining whether the radio source really is located at the position given by the positional data that it transmits.

Since the method is used in a self-reporting vehicle surveillance system, meaning that each vehicle transmits positional data indicating its own position, a mismatch between the alleged position of a vehicle according to the received data and the estimated position of the radio source indicates that something is not right and that the received positional data cannot be indiscriminately relied upon.

The determined deviation value can hence be used as an indicator of the reliability of the received positional data.

The step of estimating the bearing from the receiving unit to the radio source is, according to one embodiment of the invention, performed by receiving the signal with a directional antenna connected to a transceiver circuitry which is adapted to determine the bearing to the radio source based on the output from the directional antenna.

The step of estimating the distance between the receiving unit and the radio source may be performed in different ways depending on e.g., the type of data link used for the transmission of the signal and the information carried by the signal.

When the signal carrying the positional data is transmitted over a time-synchronized data link, meaning that transmissions over that data link are initiated at points in time that are known by all users of the data link, the signal carrying the positional data can be used to estimate the distance between the radio source and the receiving unit. By determining the point in time at which the signal is received, the approximate time elapsed between transmission and reception of the signal can be determined by the receiving unit as the point in time at which transmission was initiated is known. This time corresponds to the time of flight for the signal and since the signal travels at known speed (the speed of light), the distance between the radio source and the receiving unit can be determined. An example of a time-synchronized data link to which this method is applicable is the STDMA data link used in ADS-B systems conforming to the VDL Mode 4 format.

If the signal carrying the positional data also carries information about its own transmission time, the distance between the radio source and the receiving unit can also be estimated using this signal alone. The receiving unit can use the transmission time information contained in the signal and the reception time of the signal to determine the signal time of flight, and hence the distance, between the radio source and the receiving unit. This method is applicable to, e.g., ADS-B systems based on UAT.

If it is not possible to estimate the distance to the radio source based on the signal carrying the positional data, the receiving unit can be equipped with additional distance measuring equipment, such as primary radar equipment, laser detection and ranging equipment, and/or secondary surveillance radar equipment. When a signal carrying positional data relating to an alleged position of a vehicle is received by the receiving unit, the additional distance equipment can be used to estimate the distance to the radio source from which the signal originated. Today, this method must be used in, e.g., ADS-B systems based on Mode S ES.

According to an aspect of the invention, the method is used to discard received positional data that is found unreliable. When the method is used in, e.g., an aircraft-based aircraft surveillance system or a ground-based ATC system, the suggested method ensures that navigational decisions are made based on correct information of surrounding traffic, which considerably increases the safety of such systems.

The object is also achieved by a vehicle surveillance system for validating positional data in vehicle surveillance applications wherein vehicles transmit positional data indicating their own position to surrounding vehicles, such as an ADS-B-based aircraft surveillance application. The vehicle surveillance system comprises:

bearing-estimation means adapted to receive a signal carrying positional data indicating an alleged position of a vehicle, transmitted from a radio source, said bearing-estimation means further being adapted to estimate the bearing to said radio source using said received signal;

distance-estimation means adapted to estimate the distance to the radio source based on the time of flight, TOF, for a signal received there from, which signal travels at known speed;

calculating means adapted to calculate an estimated position of the radio source based on the estimated bearing and the estimated distance, and comparing means adapted to determine a deviation value indicating the deviation/coincidence between the alleged position of a vehicle according to the received positional data and the estimated position of the radio source.

The vehicle surveillance system according to the invention may be included in any type of receiving unit, such as a vehicle or stationary unit, for validating positional data that is transmitted from surrounding radio sources. For example, it can be included in aircraft or ships for use in separation provision and/or collision avoidance applications, or it can be included in ground-based ATC or VTS stations for monitoring air traffic or maritime traffic, respectively.

Besides the increased flight safety offered by the vehicle surveillance system according to the invention, aircraft comprising such systems and using them for automatic aircraft separation provision will lower their fuel consumption since their pre-programmed flight plan will not be altered due to erroneous ADS-B messages reported by surrounding radio sources.

BRIEF DESCRIPTION OF THE DRAWINGS

The present invention will become more fully understood from the detailed description provided hereinafter and the accompanying drawings, which are not necessarily to scale, and are given by way of illustration only. In the different drawings, same reference numerals correspond to the same element.

ACRONYMS AND ABBREVIATIONS

Figure 1A:
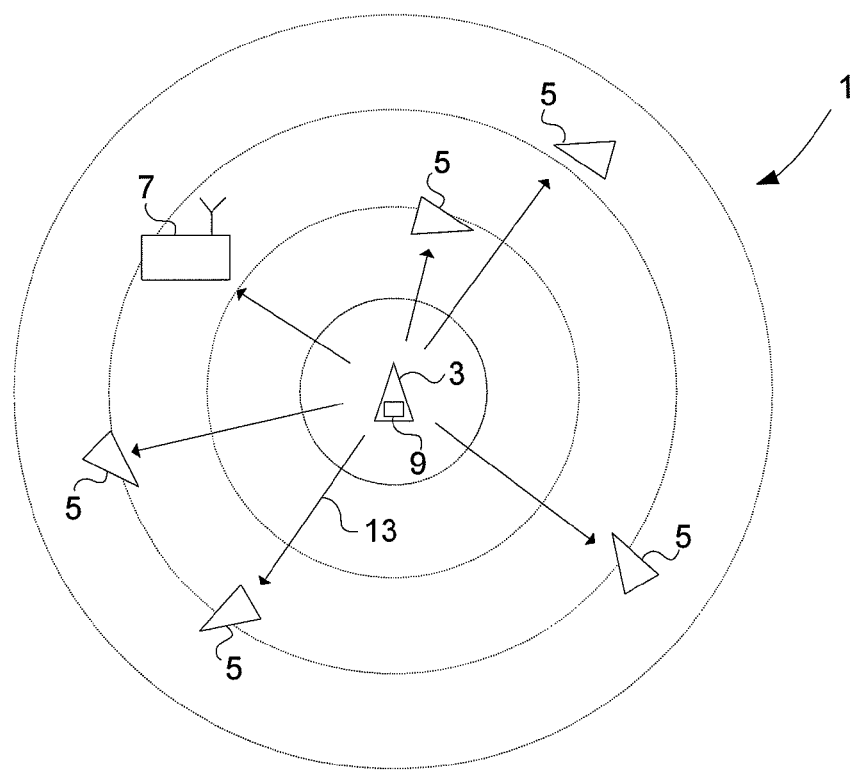
FIGS. 1A and 1B illustrate a typical operational environment of the invention.

Acronym Definition
ADS-B Automatic Dependent Surveillance-Broadcast
AIS Automatic Identification System
ATC Air Traffic Control
LADAR Laser Detection and Ranging
Mode S ES Mode-S Extended Squitter
MSO Message Start Opportunities
STDMA Self-organizing Time Division Multiple Access
TCAS Traffic alert and Collision Avoidance System
TDMA Time Division Multiple Access
TOF Time of Flight
UAT Universal Access Transceiver
UAV Unmanned Aerial Vehicle
UTC Coordinated Universal Time
VDL VHF Data Link
VTS Vessel Traffic Service

DETAILED DESCRIPTION

An aircraft or an air traffic control (ATC) ground station utilizing an ADS-B-based vehicle surveillance system is completely dependent on that the information in ADS-B messages received from surrounding aircraft is correct. Specifically, positional data contained in the ADS-B messages from emitting aircraft have to be trusted to be correct. The flaw is that as long as the received messages conform to the correct format they will be interpreted as ADS-B messages and, as such, relied upon by the vehicle surveillance systems. This fact makes ADS-B-based vehicle surveillance systems extremely vulnerable to ADS-B transponder malfunction and malicious use by transmission of faked ADS-B data.

All three data link technologies (Mode S ES, VDL Mode 4 and UAT) used for ADS-B suffer from the same shortcoming; the receiver of a message does not have any means to check whether the contents of the message are valid. An erroneous report will not be detected as long as it conforms to the proper message format.

This flaw is considered to be both a safety and security problem and is considered to be a major obstacle for future use of ADS-B data in various vehicle surveillance systems, such as aircraft-based separation provision and/or collision avoidance systems, and stationary traffic surveillance systems, such as for example ATC systems used to monitor air traffic near airports.

The invention presented herein is a method and a system which greatly increases the safety of a vehicle surveillance system based on ADS-B by providing a possibility to validate the positional data contained in received ADS-B messages.

The proposed principles utilize the fact that the vehicle positions in an ADS-B-based vehicle surveillance system are self-reported, meaning that all vehicles in such a system broadcast state vectors indicating their own position. By providing a possibility to estimate the position of a radio source from which a received ADS-B message was transmitted, the invention allows for validity check of the positional data contained in the received message. In general term, this is achieved by checking whether the estimated position of the radio source from which the ADS-B message was transmitted coincides sufficiently well with the position stated in the message. Since the vehicle positions are supposed to be self-reported, a mismatch between the estimated and reported position indicates that the reported position cannot be indiscriminately relied upon.

This improvement will enhance the criticality of the positional data in vehicle surveillance systems based on ADS-B and thus enable use of the data in safety critical vehicle surveillance systems.

As will be understood, the principles described herein for validating positional data is relevant and applicable to any vehicle surveillance system receiving self-reported positional data from surrounding vehicles. However, it will hereinafter be described mainly in the context of ADS-B-based aircraft surveillance system for separation provision and/or collision avoidance applications, residing in an aircraft. Aircraft-based aircraft surveillance systems used for separation provision applications, collision avoidance applications, or both, are sometimes referred to as Sense & Avoid systems.

Figure 1B:
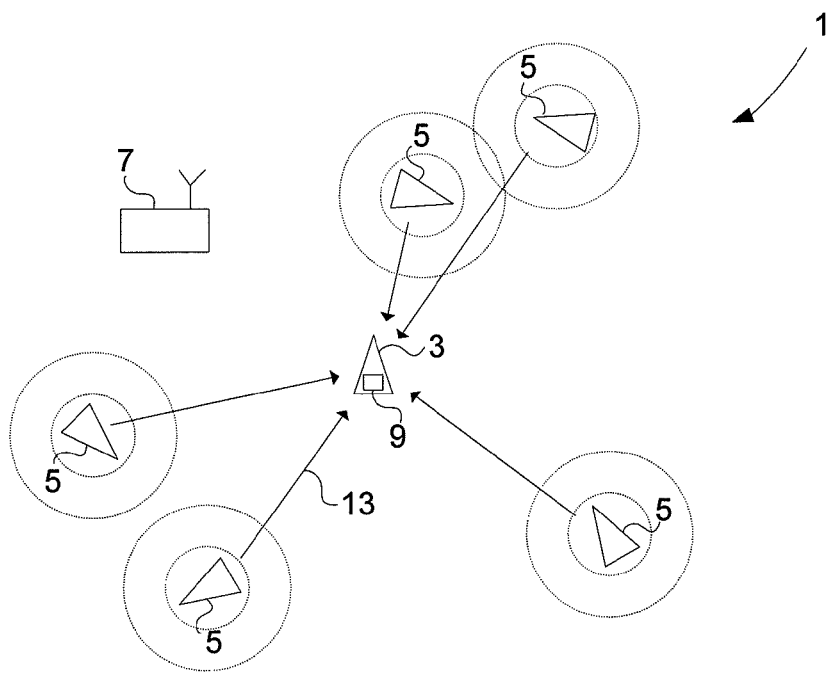

FIGS. 1A and 1B illustrate airspace 1 in which a host aircraft 3 surrounded by a plurality of surrounding aircraft 5 are located. An ATC ground station 7 for supervising the air traffic in the airspace 1 is also shown.

Each aircraft 3, 5 comprises an ADS-B transponder 9 (only shown for host aircraft 1 for illustrative purposes) for broadcasting their state vectors to all nearby aircraft and ground stations, and for receiving and interpreting ADS-B messages 13 from surrounding aircraft. The ATC ground station 7 also comprises an ADS-B transponder for receiving and interpreting received messages. The ADS-B messages 13 comprise positional data relating to the positions of the aircraft from which they are transmitted. Typically, the ADS-B messages also comprise other aircraft specific status information, such as an aircraft identifier and the current speed of the aircraft.

In FIG. 1A the host aircraft 3 broadcasts its state vector to all nearby aircraft 5 and the ground station 7, and in FIG. 1B the surrounding aircraft 5 broadcast their state vectors to the host aircraft 3 and typically also to all other aircraft 5 as well as the ground station 7. In this way, each aircraft 3, 5 as well as the ground station 7 can have a complete picture of all aviation traffic in the monitored airspace 1.

The ADS-B transponder 9 onboard each aircraft 3, 5 may be any of the ADS-B transponder types currently under consideration, i.e. a Mode S ES transponder, a VDL Mode 4 transponder or a UAT transponder. However, the different types of ADS-B transponders conform to different message formats and are, as of today, unable to communicate with each other. Therefore, all aircraft 3, 5 should be equipped with the same type of ADS-B transponders 9, or at least compatible ADS-B transponders 9, and the aircraft surveillance system of the ATC ground station 7 should be designed to support reception and interpretation of messages sent over the airborne data link (Mode S ES, VDL Mode 4 or a UAT) defined by that particular type of ADS-B transponder 9.

Figure 2A:
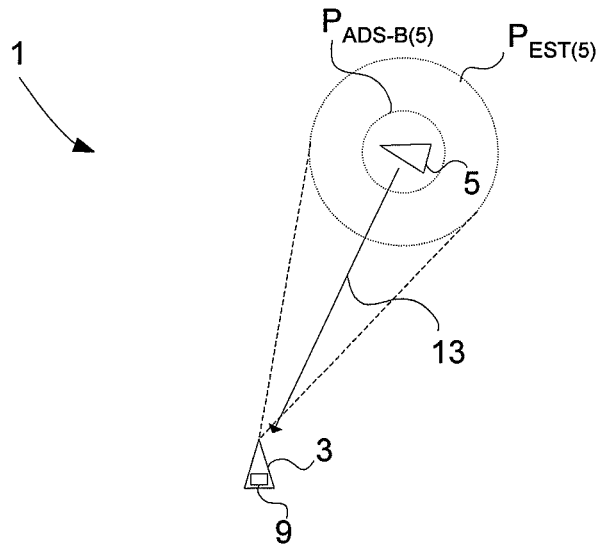
FIGS. 2A and 2B illustrate schematically the concept of the present invention.
Figure 2B:
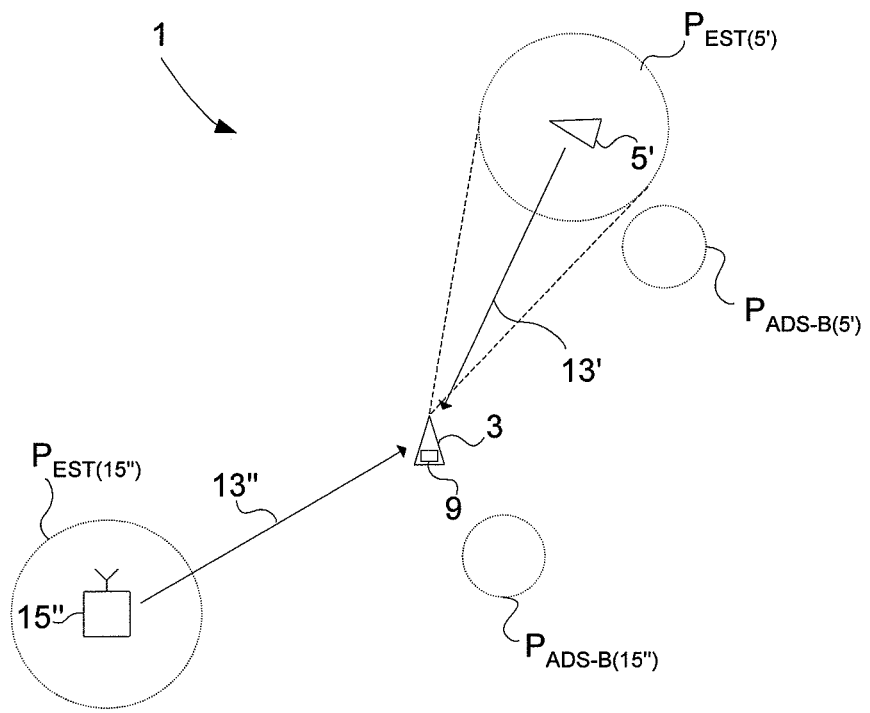

FIGS. 2A and 2B illustrate schematically the concept of the present invention.

In FIG. 2A, an aircraft 5 transmits an ADS-B message 13 carrying information indicating at least the position $P_{ADS-B(5)}$ of said aircraft 5. The alleged position $P_{ADS-B(5)}$ of a vehicle as stated in an ADS-B message 13 will hereinafter be referred to as the ADS-B position or reported position. The positional data contained in an ADS-B message is associated with a certain uncertainty and, therefore, the ADS-B position $P_{ADS-B(5)}$ of the aircraft 5 is illustrated with a dotted circle that is somewhat bigger than the actual aircraft. Typically, the positional data contained in an ADS-B message 13 is based on GPS information and is therefore associated with a well known uncertainty which, as well known in the art, for example depends on how many GPS satellites the aircraft has contact with when the position is determined.

The host aircraft 3 picks up the ADS-B message 13 and registers the reported position $P_{ADS-B(5)}$ of the aircraft 5. However, instead of indiscriminately relying on the reported ADS-B position $P_{ADS-B(5)}$ and e.g. use said position as input parameters to a Sense & Avoid system of the host aircraft 3, the host aircraft 3 according to the invention comprises means for validating the received positional data. As mentioned above, this is in general terms achieved by estimating the position $P_{EST(5)}$ of the radio source 5 from which the ADS-B message 13 was transmitted and comparing said estimated position $P_{EST(5)}$ with the reported ADS-B position $P_{ADS-B(5)}$. By comparing the position $P_{ADS-B(5)}$ indicated by the positional data in the received ADS-B message 13 with the estimated position $P_{EST(5)}$, the host aircraft 3 and its Sense & Avoid system can take actions, such as refusing the received positional data to be used in flight safety critical applications, if the two positions $P_{ADS-B(5)}$, $P_{EST(5)}$ do not coincide sufficiently well. The way the estimated position $P_{EST(5)}$ of the radio source 5 transmitting the ADS-B message 13 is calculated will be described in more detail later on.

The estimated position $P_{EST(5)}$ is also associated with an uncertainty which, as illustrated by a circle that is somewhat bigger than the one illustrating the ADS-B position $P_{ADS-B(5)}$, typically is larger than the uncertainty associated with the reported ADS-B position $P_{ADS-B(5)}$. Although illustrated as circles for the sake of simplicity, it should be appreciated that both the ADS-B position $P_{ADS-B(5)}$ and the estimated position $P_{EST(5)}$ are associated with uncertainties in all space dimension and that the dotted lines hence should be construed as cross sections of three-dimensional bodies of which shape depend on the positional uncertainties in each space dimension. The uncertainties associated with the ADS-B position $P_{ADS-B(5)}$ and the estimated position $P_{EST(5)}$, respectively, are preferably accounted for when the two positions are compared.

While FIG. 2A illustrates a scenario in which the reported ADS-B position $P_{ADS-B(5)}$ of aircraft 5 coincides with its position $P_{EST(5)}$ as estimated by the host aircraft 3, indicating that the radio source from which the received ADS-B message 13 was transmitted most likely is located at said position $P_{ADS-B(5)}$ and that the positional data hence can be relied upon, an opposite scenario will now be described with reference to FIG. 2B.

In FIG. 2B, an aircraft 5' transmits an ADS-B message 13' which is received by the host aircraft 3. The host aircraft 3 retrieves the positional data contained in the ADS-B message 13' and registers the reported ADS-B position. In accordance with what is described above, the host aircraft 3 also calculates an estimated position $P_{EST(5')}$ of the radio source 5' from which the message 13' was transmitted, which position $P_{EST(5')}$ in this case is seen to deviate substantially from the position of the aircraft 5' as stated in the ADS-B message 13'. The deviation between the self-reported position $P_{ADS-B(5')}$ and the estimated position $P_{EST(5')}$ indicates to the host aircraft 3 that the positional data in the received ADS-B message 13' cannot be indiscriminately relied upon.

Since the ADS-B system is based on that each aircraft broadcasts its own state vector, a mismatch between the position of a nearby aircraft according to a received ADS-B message and the estimated position of the radio source transmitting said ADS-B message typically depends on one of two things: First, the ADS-B transponder, the GPS receiver, or any other vital system component of the transmitting aircraft may be malfunctioning. Secondly, the radio source transmitting the ADS-B message may be deliberately arranged to report another position than its own. It is a well-known weakness of the ADS-B system that "fake" ADS-B messages may be broadcasted deliberately with malicious intent in order to create confusion or even in order to take out the aircraft surveillance system of both aircraft and ground stations in a certain area by flooding that area with deceptive ADS-B messages.

The latter scenario is also illustrated in FIG. 2B where a malicious ADS-B message 13" is seen to be transmitted from an ADS transponder 15" located on the ground. The positional data contained in the ADS-B message 13", which is received and registered by the host aircraft 3, deceptively alleges that an aircraft is located at the position $P_{ADS-B(15'')}$. However, when the host aircraft 3 (or any other unit receiving the message 13" and having an aircraft surveillance system utilizing the inventive concept disclosed herein) tries to validate the received positional data by estimating the position of the radio source 15" from which it received the message 13", it will find a mismatch between the position of the radio source 15" and the alleged position $P_{ADS-B(15'')}$ of an aircraft and can hence discard the positional data contained in the received ADS-B message 15" as unreliable.

The method and means for validating received positional data will now be described in more detail.

In order to estimate the positions $P_{EST(5)}$, $P_{EST(5')}$ of the radio sources 5, 5', 15" broadcasting the ADS-B messages 13, 13', 13" in FIGS. 2A and 2B, the host aircraft 3 comprises a radio direction finding antenna arrangement, such as a directional antenna arrangement, which can be used to determine the bearing to a radio source by analyzing a radio signal received there from. How such antenna arrangements are designed and used to determine the approximate bearing to a radio source from which a signal is received is well known in the art and need not further be described herein.

The distance from the host aircraft 3 to the radio source 5, 5', 15" broadcasting the ADS-B message 13, 13', 13" is estimated based on the time of flight (TOF) for a signal travelling at a known speed between the radio source and the host aircraft. Preferably, when possible, the distance is determined based on the TOF for the ADS-B message 13, 13', 13" carrying the positional data that is to be validated.

Figure 3:
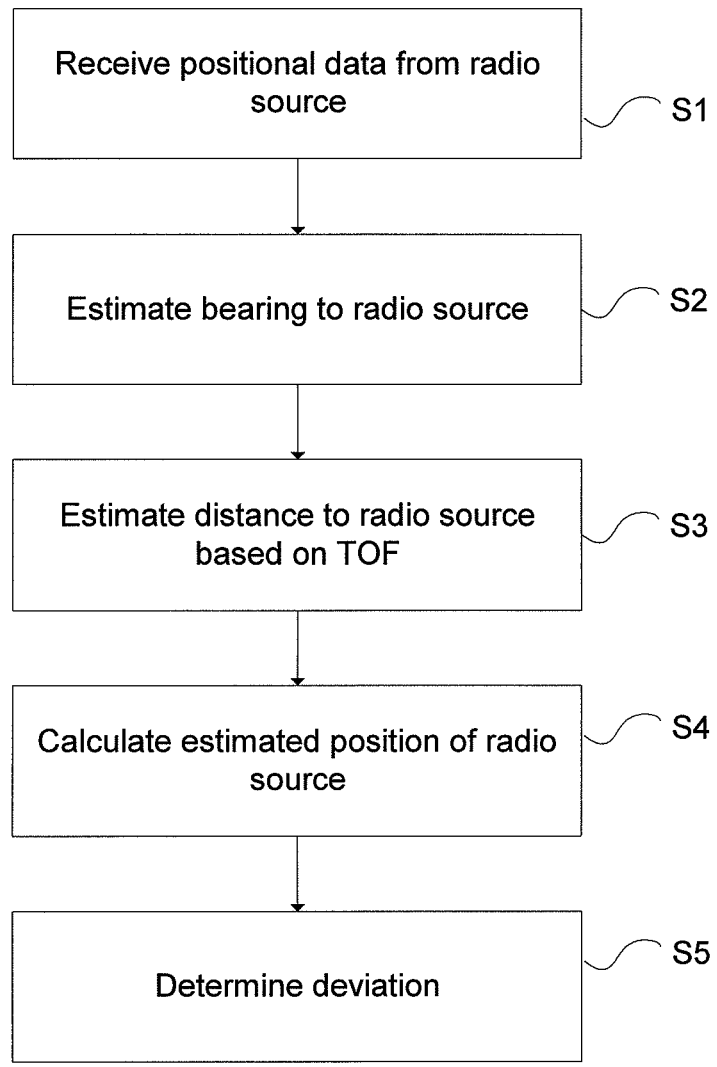
FIG. 3 is a flowchart illustrating a method for validating received positional data according to the invention.
Figure 4A:
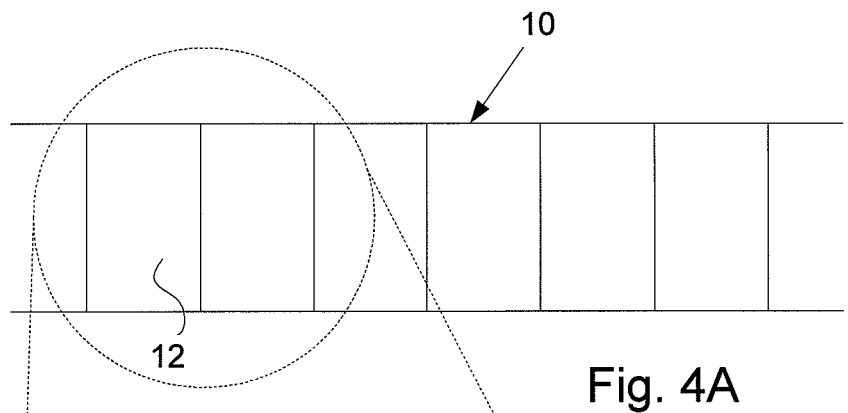
FIGS. 4A and 4B illustrate a principle for determining the time of flight for an ADS-B VDL Mode 4 message between a radio source and a receiving unit.
Figure 4B:
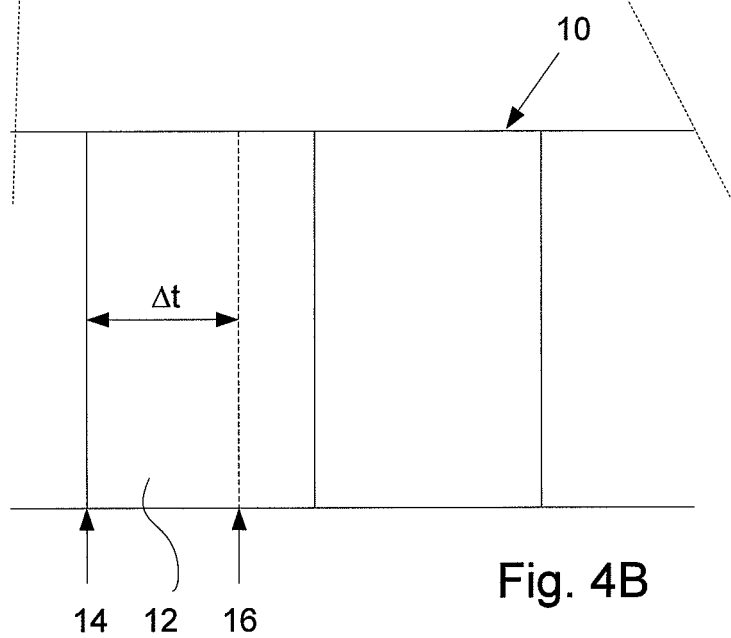

FIG. 3 is a flowchart illustrating a method for validating received positional data according to the invention. The method steps may be performed by any receiving unit receiving such data, such as a vehicle (e.g. an aircraft) or a stationary unit (e.g. an ATC ground station). When describing the method, simultaneous reference will, however, be made to the exemplary operational environment of the invention illustrated in FIGS. 2A and 2B, in which the receiving unit is the host aircraft 3.

In step S1, a signal 13, 13', 13" originating from a radio source 5, 5', 15" is received by the host aircraft 3 by means of a radio direction finding antenna arrangement capable of estimating the bearing to the emitting radio source. The signal 13, 13', 13" carries positional data that indicates an alleged position $P_{ADS-B(5)}$, $P_{ADS-B(5')}$, $P_{ADS-B(15'')}$ of an aircraft. "Alleged" here means that there may or may not be an aircraft at the position reported by the radio source. The invention is intended for a vehicle surveillance system in which each vehicle transmits its own position, and the case in which an aircraft is not at the position reported by the radio source hence indicates either system equipment malfunction or that the radio source is deliberately arranged to transmit deceptive positional data.

In step S2, the bearing to the radio source 5, 5', 15" transmitting the signal 13, 13', 13" that carries the positional data is estimated by the host aircraft 3 by analyzing the signal 13, 13', 13" received with the radio direction finding antenna arrangement in known ways.

In step S3, the host aircraft 3 estimates the distance to the radio source 5, 5', 15" based on the TOF for a signal travelling between the radio source and the host aircraft 3, and the propagation velocity (the speed of light) of the signal. Preferably, the distance is estimated based on the TOF for the signal 13, 13', 13' carrying the positional data that is to be validated. However, the distance may be estimated based on the TOF also for other signals transferred between the radio source and the host aircraft. The way the host aircraft 3 estimates the distance to the radio source may vary depending on, e.g., the type of data link used for the transmission and the information content of the signal and will be described in more detail below.

In step S4, the host aircraft 3 calculates an estimated position $P_{EST(5)}$, $P_{EST(5')}$, $P_{EST(15'')}$ of the radio source 5, 5', 15" based on the bearing estimated in step S2 and the distance estimated in step S3.

In step S5, the host aircraft 3 determines a deviation value indicative of the deviation/coincidence between the aircraft position $P_{ADS-B(5)}$, $P_{ADS-B(5')}$, $P_{ADS-B(15'')}$ as reported by the radio source 5, 5', 15" and the estimated position $P_{EST(5)}$, $P_{EST(5)}$, $P_{EST(15'')}$ of the radio source 5, 5', 15" calculated in step S4. If the reported position $P_{ADS-B(5)}$, $P_{ADS-B(5')}$, $P_{ADS-B(15'')}$ is an absolute position, the own position of the host aircraft 3 must be used when estimating the distance to the reported position. If, on the other hand, the reported position $P_{ADS-B(5)}$, $P_{ADS-B(5')}$, $P_{ADS-B(15'')}$ is a relative position of an aircraft in relation to the host aircraft, knowledge about the host aircraft's own position is not needed. The determined deviation value is an indicator of the reliability of the received positional data and can be used as a basis for deciding whether the received positional data should be used or discarded by the receiving unit (in this exemplary case host aircraft 3).

Now, method step S3 will be described in more detail with simultaneous reference to FIGS. 2A and 2B. As aforementioned, the estimated distance to the radio source 5, 5', 15" is based on the TOF for a signal travelling between the radio source and the host aircraft 3 at known speed, and the way the TOF determination is performed depends on the data link type over which the positional data is transmitted.

Distance Estimation in VDL Mode 4

First, a concept for determining the TOF for an ADS-B message 13, 13', 13" conforming to the VDL Mode 4 format will be described.

VDL Mode 4 is based on STDMA which is a channel access method allowing several users to share the same frequency channel by dividing it into different slots based on time. Each ADS-B transponder conforming to the VDL Mode 4 format is required to transmit its state vector in specific timeslots. The start of each timeslot is determined by the VDL Mode 4 standard and based on UTC (GPS time). Each timeslot starts at a specific point in time and ends at a specific point in time (as defined by UTC), which points in time are globally defined and known by all VDL Mode 4 transponders. More detailed information about VDL Mode 4 and STDMA is found in, e.g., the document entitled "Self-organizing Time Division Multiple Access VDL Mode 4-Standards and Recommended Practices", which is Appendix D of the Report on Agenda Item 5 of the fourth meeting of the Aeronautical Mobile Communications Panel (AMCP/4); Montreal, 25 Mar.-4 Apr. 1996 (also found on the Internet at http://www.icao.int/anb/panels/acp/meetings/amcp4/item-5d.pdf, 2008 Apr. 22).

The proposed principle for determining the TOF for a VDL Mode 4 message is to estimate the TOF based on the time between the start of the timeslot in which the message is received and the point in time at which the message is received.

This principle is illustrated in FIGS. 3A and 3B which illustrate a frame 10 that is a part of a VDL Mode 4 data stream. The frame 10 is divided into a plurality of timeslots 12. Different timeslots are allocated to different VDL Mode 4 transponders. For example, the timeslot indicated by reference numeral 12 can be allocated to the aircraft indicated by reference numeral 5 in FIG. 2A. At the start 14 of the timeslot 12, the aircraft 5 broadcasts the VDL Mode 4 message 13 over the STDMA-based VDL Mode 4 data link.

Typically, the transmission of the VDL Mode 4 message 13 commences almost immediately upon the start 14 of the timeslot 12 allocated for that transmission. According to the VDL Mode 4 standard and recommended practice, transmission of a VDL Mode 4 message should commence no later than 1 microsecond after the start 14 of the timeslot 12 allocated for that transmission, which normally is a much longer time period than needed. The host aircraft 3, which also comprises a VDL Mode 4 transponder 9 and hence knows when each timeslot starts and ends, receives the message 13 at some point in time 16 within the timeslot 12 (the STDMA timeslots are long enough to ensure that at least the start of a VDL Mode 4 message is received within the same timeslot as it is broadcasted). The host aircraft 3 comprises means to determine the point in time 16 at which the message 13 arrives. Typically, the VDL Mode 4 transponder 9 itself comprises means for determining when a message 13 is received. Since the VDL Mode 4 transponder of the host aircraft knows exactly when the timeslot started, the elapsed time Δt between start of the timeslot and reception of the message can be determined. As this time Δt substantially corresponds to the TOF of the VDL Mode 4 message 13, and as the radio signal carrying the message 13 propagates at known speed (the speed of light), the host aircraft 3 can calculate an estimated distance $d_{EST(5)}$ to the aircraft 5 from which it received the VDL Mode 4 message 13. As the VDL Mode 4 standard permits a transponder to commence transmission up to 1 microsecond after the start of a timeslot, such a transmission delay is preferably accounted for by the receiving unit when determining the TOF for the signal. For example, the TOF may be estimated as the elapsed time Δt between start of the timeslot and reception of the signal minus 500 nanoseconds (half the allowable transmission delay).

The above described method for estimating a distance to a radio source from which a signal is received is applicable to all communications systems using STDMA-based radio links. Besides ADS-B VDL Mode 4 systems for air traffic surveillance, an example of such a system is the AIS system which is commonly used for maritime traffic surveillance. In both the ADS-B VDL Mode 4 system and the AIS system, the vehicles (aircraft and ships/vessels, respectively) transmit positional data indicating their own position to surrounding vehicles.

It should also be appreciated that the method described above is not limited to systems using STDMA-based radio links but is applicable in any communications system using time-synchronized data links over which transmissions are initiated at points in time that are known by all users of the data link.

Distance Estimation in UAT

Now, a concept for determining the TOF for an ADS-B message conforming to the UAT format will be described.

Transmissions over the UAT data link are one of two general types; a ground uplink message or an ADS-B message. When the term "UAT message" is used hereinafter, it refers to the ADS-B message of a UAT transmission. Contrary to ADS-B messages conforming to the VDL Mode 4 format, UAT messages are broadcasted on pseudorandom basis. A UAT frame that has a length of 1 second typically comprises 3200 so called Message Start Opportunities (MSO), each associated with a well-defined point in time (UTC). The transmission of a UAT message occurs at a randomly chosen MSO within the UAT frame.

The information transmitted in a UAT message is referred to as the "Payload" and besides the state vector of the aircraft (comprising e.g. the positional data), a UAT message payload includes the MSO at which it was broadcasted. That is, a UAT message carries information of its own precise transmission time.

By determining the point in time at which a UAT message is received, and by establishing the point in time at which the message was transmitted based on the MSO information in the message, the elapsed time between transmission and reception, i.e. the TOF, of a UAT ADS-B message can be determined.

As in the case with VDL Mode 4 messages described above, an aircraft receiving a UAT message from a nearby aircraft can hence estimate the distance to that aircraft based on the TOF of the message.

Distance Estimation in Mode S ES

Mode S ES messages, i.e. ADS-B messages conforming to the Mode S ES format, are randomly broadcasted and, unlike UAT messages, they carry no information about the point in time at which they were transmitted. Today, there are therefore no known ways of establishing the exact TOF for a Mode S ES message.

In order to calculate an estimated position of a radio source from which a Mode S ES message originates, the receiving unit needs to comprise additional distance measuring equipment. Such additional distance measuring equipment may be, e.g., primary radar equipment, laser detection and ranging (LADAR) equipment, or secondary surveillance radar equipment, all known in the art for utilizing signal TOF for estimating distances to surrounding objects.

That is, if for example the ADS-B message 13 broadcasted by aircraft 5 in FIG. 2A is a Mode S ES message 13, the host aircraft 3 must comprise additional distance measuring equipment in order to calculate an estimated position $P_{EST(5)}$ of the aircraft 5. However, thanks to the radio direction finding antenna arrangement with which the Mode S ES message 13 is received according to the invention, the host aircraft 3 can still estimate a bearing to the transmitting aircraft 5. A measure of the bearing can be sufficient to establish that the reported Mode S ES position $P_{ADS-B(5)}$ is erroneous and cannot be relied upon.

If the host aircraft 3 comprises conventional radar or LADAR equipment, the TOF for the radar radio signal or LADAR laser pulse signal can be used for estimating a distance to the aircraft 5. An estimated position $P_{EST(5)}$ of the aircraft 5 can then be calculated based on the bearing estimated by means of the radio direction finding antenna arrangement receiving the Mode S ES message 13 and the distance estimated using the TOF of the reflected radar or LADAR signal.

Besides or instead of conventional radar and/or LADAR equipment, the host aircraft 3 may comprise a rapidly-steerable radar connected to control means and drive means which are arranged to steer the radar based on the positional data contained in received Mode S ES messages. As soon as a Mode S ES message 13 is received by the host aircraft 3, such a rapidly-steerable radar can be directed towards the position $P_{ADS-B(5)}$ stated in the Mode S ES message 13 to obtain a TOF of a radar signal reflected by the aircraft 5 that broadcasted the Mode S ES message. Thereby, an estimated position $P_{EST(5)}$ of the aircraft 5 can be calculated. The radar beam should of course be wide enough to allow for changes in aircraft position during alignment of the steerable radar. Such changes in aircraft position can also be accounted for by allowing a larger deviation between the reported Mode S ES position $P_{ADS-B(5)}$ and the estimated position $P_{EST(5)}$ without discarding the reported Mode S ES position as erroneous.

The host aircraft 3 may also comprise secondary surveillance radar equipment, such as e.g. a Mode S transponder and interrogator which are used in TCAS systems of today as described in the background portion. The interrogator, which in conventional secondary surveillance radar systems typically broadcasts general presence requests/interrogations on a periodic basis, can be arranged to broadcast a presence request immediately upon reception of a Mode S ES message, such as the Mode S ES message 13 from the nearby aircraft 5. If the aircraft 5 comprises a transponder conforming to the same data format as the interrogator of the host aircraft 3, it will respond to the request. The interrogator of the host aircraft 3 can then determine the TOF for a radio signal travelling between the two aircraft 3, 5 based on the time elapsed between the transmission of the request/interrogation and the reception of the response (which time hence equals twice the signal TOF between the aircraft 3, 5 plus additional signal processing delays which can be accounted for).

It should also be appreciated that, as an increase in Mode S ES radio traffic is expected, future generations of Mode S ES may support globally or locally time synchronized broadcasting of Mode S ES messages to avoid interference-related issues. In such a case, it would probably be possible to estimate the distance to a radio source transmitting a Mode S ES message in a way similar to the above described way of estimating the distance to a radio source transmitting a VDL Mode 4 message. It is also possible that future generation of Mode S ES will allow for inclusion of transmission time information in the Mode S ES messages, in which case the method described above for estimating the distance to a radio source broadcasting a UAT message can be utilized for the distance estimation.

Figure 5:
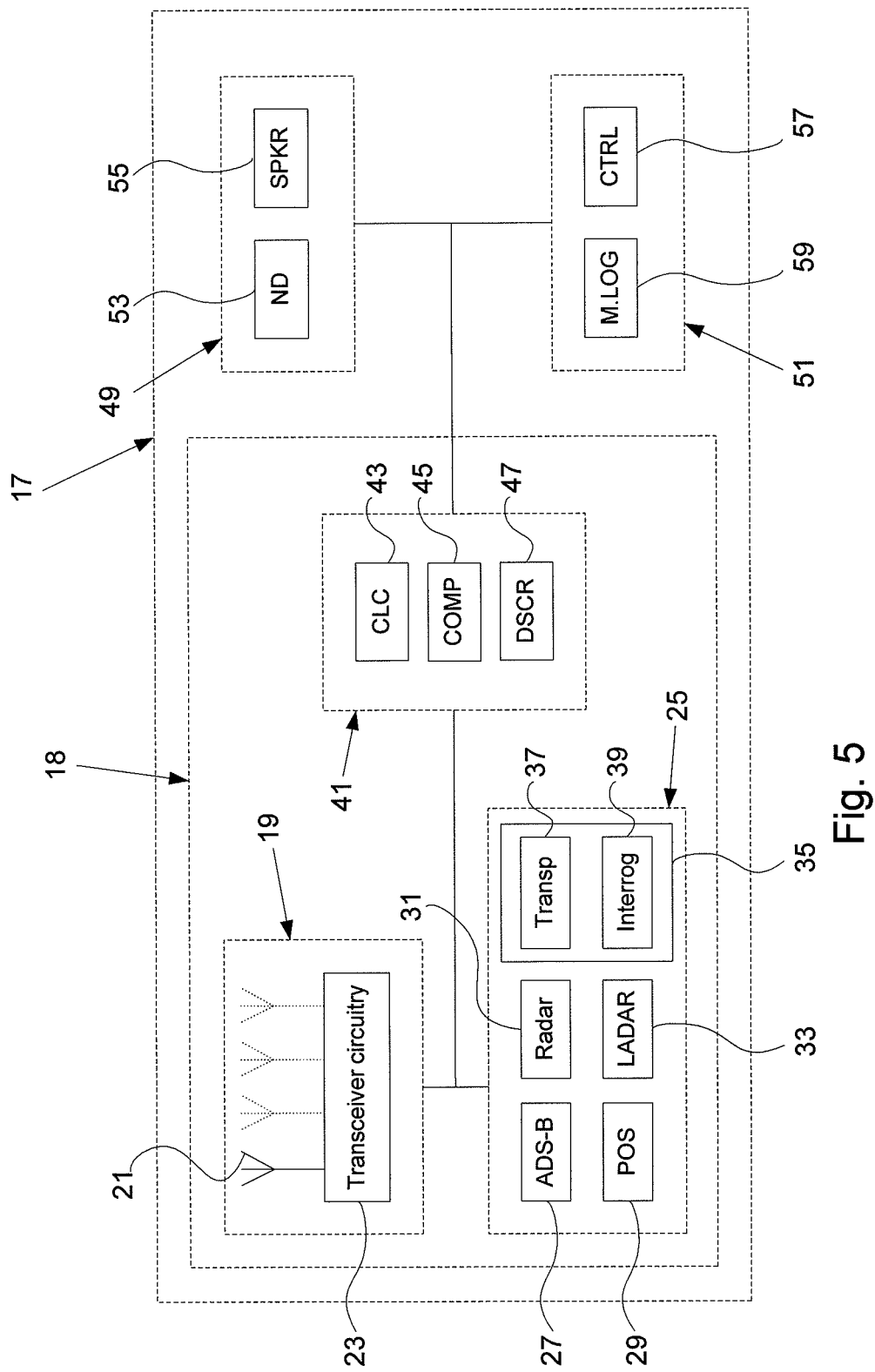
FIG. 5 illustrates an embodiment of a vehicle surveillance system according to the invention.

FIG. 5 illustrates an embodiment of a vehicle surveillance system 17 according to the invention. The vehicle surveillance system 17 comprises a subunit 18 which may be included in any type of receiving unit, such as a vehicle or stationary unit, for validating self-reported positional data. In this exemplary embodiment, however, the vehicle surveillance system subunit 18 is used in an ADS-B-based aircraft surveillance system 17 for aircraft separation provision and/or collision avoidance applications. It should be understood that the vehicle surveillance system 17 in FIG. 5 is associated with a host aircraft, such as the host aircraft 3 in FIGS. 2A and 2B. The host aircraft comprising the aircraft surveillance system 17 may be a conventional manned aircraft or a UAV that is either manually but remotely piloted or that flies autonomously based on pre-programmed flight plans.

The aircraft surveillance system 17 comprises an antenna module 19 comprising a radio direction finding antenna arrangement. In this exemplary embodiment, the direction finding antenna arrangement comprises at least one directional antenna 21. Typically, the antenna module 19 comprises a plurality of antennas for various purposes and may, besides the directional antenna 21, for example comprise an omnidirectional antenna, a planar array antenna and a dipole antenna, illustrated in dotted lines. The antenna(s) are connected to transceiver circuitry 23 for processing signals transmitted and received by said antenna(s).

The aircraft surveillance system 17 further comprises a sensor module 25 which typically comprises a plurality of passive and active sensors for monitoring and communicating with the world around.

The sensor module 25 comprises an ADS-B functionality module 27, typically in form of a conventional ADS-B transponder, for generating and for processing ADS-B messages. The ADS-B transponder 27 may be any of a Mode S ES transponder, a VDL Mode 4 transponder or a UAT transponder. The ADS-B module 27 may also comprise two or all three of said ADS-B transponder types to ensure compatibility with ADS-B transponders of nearby aircraft. Future ADS-B systems are likely to use transponders supporting all three of the above mentioned data link formats. Such a transponder would be an obvious part of the ADS-B module 27. The ADS-B functionality module 27 is connected, via the transceiver circuitry 23, to the directional antenna 21 which is used at least for receiving incoming ADS-B messages.

The sensor module 25 further comprises a positioning functionality module 29 for self-location determination. Typically but not necessarily, the positioning functionality module 29 is a GPS receiver receiving GPS data enabling it to determine its own and thereby the host aircraft position, speed and direction of motion, as well as determining UTC time.

The positioning module 29 may also use other navigational systems such as the Galileo positioning system or the GLONASS in order to determine its position in global coordinates. The positioning module 29 could also include an inertial navigation module keeping track of the host aircraft position without the need of external references. Additional functionality well known in the art for further increasing the accuracy in the positioning of a GPS receiver may also be included in the positioning module 29. The positioning functionality module 29 may also include sensors for measuring the atmospheric pressure, thus enabling the host aircraft elevation to be determined without the need of external references as well known in the art. The positioning module 29 may comprise one or several built-in antennas and/or use one or several antennas in the antenna module 19 for receiving signals, e.g. from GPS satellites, enabling self-location determination. The positioning module 29 is connected to the ADS-B module 27 for providing the ADS-B module 27 with information relating to the position of the host aircraft in which the aircraft surveillance system 17 resides, which information then may be included in ADS-B messages transmitted by the host aircraft. The positioning module 29 may also form an integral part of the ADS-B functionality module 27.

The sensor module 25 may further comprise various distance measuring sensors 31, 33, 35, 37, 39 for measuring the distance to nearby aircraft.

For example, the sensor module 25 may also comprise a conventional primary radar module 31. The primary radar module 31 is coupled to one or several antennas in the antenna module 19 for transmitting and receiving radio waves. As described above, the primary radar module 31 can then be used to estimate the distance to a nearby aircraft by determining the time elapsed between transmission and reception of said radio waves when reflected by the nearby aircraft. The primary radar module 31 can also comprise control means and drive means which are arranged to steer one or several rapidly-steerable radar antennas in the antenna module 19 based on positional data contained in received ADS-B messages. This functionality is particularly intended for estimating the distance to radio sources broadcasting Mode S ES messages, as described above. The primary radar module 31 is typically connected to differently designed antennas in the antenna module 19 to provide for both short range and long range radar functionality.

The sensor module 25 may further comprise a laser detection and ranging (LADAR) module 33. The LADAR module 33 uses the same principle as primary radar systems for estimating the distance to a remote object, i.e. measuring the time delay between transmission of a signal and detection of the reflected signal. However, instead of using radio waves, LADAR devices uses laser light. To implement this functionality, the LADAR module 33 typically comprises a laser source, a laser light detector, optical transceiver circuitry and signal processing logic (not shown).

The sensor module 25 may also comprise a secondary surveillance radar module 35. The secondary surveillance radar module 35 comprises a transponder 37 and an interrogator 39. The secondary surveillance radar module 35 is coupled to one or several antennas in the antenna module 19 to broadcast presence request/interrogations and receive responses to said requests/responses as described above. The secondary surveillance radar module 35 can be arranged to transmit presence request/interrogations on a periodic basis but may also be arranged to transmit presence request/interrogations as soon as an ADS-message is received. This functionality is particularly intended for estimating the distance to radio sources broadcasting Mode S ES messages, as described above. The secondary surveillance radar module 35 is arranged to estimate the distance to nearby objects responding to a broadcasted presence request/interrogation by determining the time elapsed between the transmission of the request/interrogation and the reception of the response.

The transponder 37 may for example be a Mode S, Mode A or Mode B transponder but may conform to any known data link format which offers the same functionality. It should be appreciated that the signal transmitted by a transponder as response to a request from an interrogator does not need to carry any information and that the requirements of the data link format therefore is low. The secondary surveillance radar module 35 may use the directional antenna 21 or any other antenna in the antenna module 19 for transmission and reception of requests and responses.

Typically, the positioning module 29 is connected to each sensor 27, 31, 33, 35 in the sensor module 25 to allow the various sensors to use GPS time (UTC) and self-location data when estimating the distance to a radio source from which an ADS-B message is received. The sensors 27, 31, 33, 35 may also be connected to each other in order to use each others measurements so as to optimize their own functionality. So for example the primary 31 and secondary 35 radar modules may be connected to the ADS-B module 27 in order to adjust the steering of steerable radar antennas and the transmission of presence requests/interrogations based on the positional data contained in received ADS-B messages, and the time of reception of ADS-B messages, respectively. The various sensors 27, 31, 33, 35 may also comprise built-in clocks for determining the point in time for transmission and reception of signals.

When the directional antenna 21 receives an ADS-B message from a nearby radio source, the transceiver circuitry 23 estimates the bearing to said radio source. Depending on what format the ADS-B message conforms to, the ADS-B module 27 or some of the distance measuring sensors 31, 33, 35 estimate the distance to the radio source as previously described. The ADS-B module 27 also extracts the ADS-B position reported in the received ADS-B message, which position allegedly is the position of a nearby aircraft. Furthermore, the positioning module 29 is arranged to establish the self-location of the host aircraft when an ADS-B message is received. The estimated bearing and distance to the radio source, as well as the received ADS-B position and the established self-location of the host aircraft are then sent to a position validation unit 41.

The position validation unit 41 comprises a calculation unit 43 which is arranged to take the estimated bearing and distance to the radio source as well as the self-location of the host aircraft as input parameters and calculate an estimated position of the radio source from which the ADS-B message was received. The estimated position of the radio source and the reported ADS-B position are then provided to a comparator 45. The comparator 45 is arranged to compare the estimated position with the reported ADS-B position and determine a deviation value indicating the deviation/coincidence between the two positions. The deviation value and at least the reported ADS-B position are then sent to a discriminator 47. The discriminator 47 is arranged to process the reported ADS-B position data in different ways based on the deviation value that is determined by the comparator 45 and hence indicative of the reliability of the currently processed ADS-B position data. Preferably, the discriminator 47 is arranged to take the uncertainties associated with the reported ADS-B position and the estimated position, respectively, into account when determining how to process the received ADS-B position data. These uncertainties can be either pre-programmed into the discriminator 47 or provided to the discriminator 47 by the antenna module 19 and the sensor module 25 if the components responsible for retrieving the reported ADS-B position and estimate the position of the radio source are capable of determining the uncertainties associated therewith.

In this exemplary aircraft surveillance system 17, the discriminator 47 is communicatively connected to an information module 49 and a decision and manoeuvring unit 51 to which it forwards the received ADS-B positions of nearby aircraft, at least when found reliable.

In a conventional, manned aircraft, the information module 49 is located in the aircraft cockpit and serves to inform the pilot about the surrounding air traffic. The ADS-B positions of the nearby aircraft are typically displayed on a graphical navigational display 53. The information module 49 is also seen to comprise a speaker 55 for providing audible warnings to the pilot in case a nearby aircraft is getting too close to the host aircraft. The host aircraft position is typically provided to the information module 49 by the positioning module 29 of the aircraft surveillance system 17. In case the host aircraft with which the aircraft surveillance system 17 is associated is a UAV, the information module 49 may reside in a ground station at which a pilot is situated to remotely control and/or supervise the UAV. In that case, data, such as the host aircraft position and the ADS-B positions of nearby aircraft received by the directional antenna 21 of the UAV, is typically broadcasted to the ground-based information module 49 over a radio link.

The decision and manoeuvring unit 51 comprises control means 57 for manoeuvring the host aircraft, and a manoeuvring logic module 59 for continuously determining the optimal flight route for the host aircraft. The manoeuvring logic module 59 is arranged to take navigation-critical data as input parameters, analyze said data and determine an optimal speed and flight direction for the host aircraft based on the result of the analysis. One such navigation-critical parameter is the reported ADS-B positions of nearby aircraft. Other may be, e.g., a pre-programmed flight plan, the current speed, position and flight direction of the host aircraft, and the current speed and flight direction of the nearby aircraft. If the host aircraft is an autonomously controlled UAV or a piloted aircraft (manned aircraft or remotely piloted UAV) currently on autopilot, the manoeuvring logic module 59 may continuously or periodically provide the control means 57 with information on the (momentarily) optimal speed and flight direction in order for the control means 57 to manoeuvre the host aircraft accordingly. If, on the other hand, the host aircraft is manually piloted from cockpit, or remotely piloted from a ground station, the optimal speed and flight direction of the host aircraft as determined by the manoeuvring logic module 59 can be provided to the pilot and used for decision-making support.

According to one aspect of the invention, the discriminator 47 of the position validation module 41 in the aircraft surveillance system 17 is arranged to discard a received ADS-B position if the deviation value indicating the deviation between said ADS-B position and the estimated position exceeds a certain threshold value. Here "discard" means that the discriminator 47 prevents the ADS-B position from reaching the information module 49 and the decision and manoeuvring unit 51. Thereby, a reported ADS-B position of a nearby aircraft that cannot be validated by the aircraft surveillance system 17 will never be presented to the aircraft pilot and/or used as a basis for automatic aircraft control.

According to another aspect of the invention, the discriminator 47 does not discard a reported ADS-B position even though it deviates substantially from the estimated position of the radio source transmitting it. Instead, when the deviation value established by the comparator 45 exceeds a certain threshold value, the discriminator 47 is arranged to add a flag indicating that the received ADS-B position may not be trustworthy to the ADS-B data before forwarding the data to the information module 49 and the decision and manoeuvring unit 51. Thereby, the information module 49 and the decision and manoeuvring unit 51 can recognize unreliable ADS-B data and act accordingly.

The information module 49 can in this case be arranged to visually or audibly alert a pilot of the host aircraft that an unreliable ADS-B position of a nearby aircraft has been received and, e.g., indicate the alleged position of the nearby aircraft on the navigation display 53. The manoeuvring logic module 59 of the decision and manoeuvring unit 51 may, upon detection of such a flag indicating an unreliable ADS-B position, be arranged to ignore the ADS-B position and not use it in the determination of the (momentarily) optimal speed and direction of flight for the host aircraft.

According to yet another aspect of the invention, a large deviation value between an ADS-B position reported by a radio source and an estimated position of that radio source can be used as an indicator for initiating an additional aircraft position validation process. If the deviation value determined by the comparator 45 exceeds a predetermined threshold value, the discriminator 47 can be arranged to ask other sensors in the aircraft surveillance system 17, such as e.g. the primary radar 31 or the LADAR 33, whether they are able to detect an aircraft at the given ADS-B position. If they are, the ADS-B position can be forwarded to and used by the information module 49 and the decision and manoeuvring unit 51 as described above. If, on the other hand, the sensors of the aircraft surveillance system 17 are unable to confirm the presence of an aircraft at the alleged ADS-B position, the discriminator 47 either discards the ADS-B positional data or sets a flag indicating that it is found unreliable before forwarding it, as also described above.

Although the functionality implementing the inventive concept has been described herein as residing in separate functional modules, such as the antenna module 19, the sensor module 25 and the position validation unit 41, it should be appreciated that this is made only to facilitate description of the aircraft surveillance system 17 and that the functionality may be implemented in many other ways without departing from the scope of the invention.

It should also be appreciated that the self-location of the host aircraft would not be a required parameter in the process of validating received positional data if the received positional data indicate the relative position of the transmitting aircraft in relation to the host aircraft instead of the absolute position of the transmitting aircraft. If, for example, a first aircraft in an airspace monitored by a ground-based ATC station receives a relative position of a second aircraft from the ATC station, this relative position could be validated by the second aircraft if transmitted to said second aircraft in a message from said first aircraft. In this case, the second aircraft does not need to know its own position in order to validate the received positional data.

The principle proposed in this document for validating received positional data ensures that navigational decisions are made based on correct information of surrounding traffic. The above described vehicle surveillance system may be included in aircraft and ground-based ATC stations as well as ships and land-based VTS stations to increase air and maritime traffic safety.

In particular, the suggested principle for validating received ADS-B positional data relating to the positions of nearby vehicles enhances the safety and security of an aircraft surveillance system which uses ADS-B data as at least one source of information. Thereby, an ADS-B-based aircraft surveillance system according to the invention can be advantageously used for both separation provision and collision avoidance applications due to the increased reliability of the data on which decisions are made.

Besides the increased flight safety offered by the vehicle surveillance system 17 according to the invention, aircraft comprising such a system and using it for automatic aircraft separation provision will lower their fuel consumption since their pre-programmed flight plan will not be altered due to erroneous ADS-B messages reported by surrounding aircraft.

As well known in the art, ADS-B transponders transmit ADS-B messages periodically at regular intervals. The proposed principle of validating positional data contained in ADS-B messages can be used to validate each and every one of the ADS-B messages received from a particular radio source, but it may also be used to validate, e.g., every tenth received ADS-B message. Once a particular radio source has been found reliable, there may not be a need to validate every single ADS-B message received there from. Thus, it should be understood that a vehicle surveillance system according to the invention can be adapted to validate positional data in received ADS-B messages continuously or periodically, or even by order of the system operator (e.g. a pilot of an aircraft equipped with the system).

It should be understood that although particularly intended for validation of ADS-B data, the inventive concept disclosed herein may be used to validate any positional data relating to the position of a vehicle from which the data allegedly is transmitted.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

It is therefore contemplated that the claims will cover any such modifications or embodiments that fall within the true scope of the invention.

The invention claimed is:

1. A method for validating received positional data in vehicle surveillance applications, wherein vehicles transmit positional data indicating their own position to surrounding vehicles, the method comprising:
receiving, with a radio direction finding antenna arrangement of a receiving unit, a signal carrying positional data indicating an alleged position of a vehicle, transmitted from a radio source;
estimating a bearing from the receiving unit to said radio source utilizing said radio direction finding antenna arrangement and a received signal;
estimating a distance between the receiving unit and the radio source based on a time of flight for a signal travelling between the radio source and the receiving unit at a known speed;
calculating an estimated position of the radio source based on the estimated bearing and the estimated distance, and
determining a deviation value indicating a deviation or coincidence between the alleged position of the vehicle according to the received positional data and the estimated position of the radio source,
wherein the signal carrying the positional data further comprises transmission time information indicating a point in time at which the signal was transmitted, and wherein estimating the time of flight comprises establishing the point in time at which the signal was transmitted based on the transmission time information, and determining a time elapsed between transmission and reception of the signal.

2. The method according to claim 1, wherein said deviation value is used as an indicator of a reliability of the received positional data.

3. The method according to claim 1, wherein said transmission time information indicates one of a plurality of opportunities within a frame at which said signal was transmitted.

4. The method according to claim 1, wherein said signal is an automatic dependent surveillance-broadcast message conforming to a universal access transceiver format.

5. The method according to claim 4, wherein said transmission time information is a message start opportunity indicating a precise transmission time of the automatic dependent surveillance-broadcast message conforming to the universal access transceiver format.

6. A vehicle surveillance system for vehicle surveillance applications, wherein vehicles transmit positional data indicating their own position to surrounding vehicles, the vehicle surveillance system comprising:
a bearing-estimator configured to receive a signal carrying positional data indicating an alleged position of a vehicle, transmitted from a radio source, said bearing-estimator further being configured to estimate a bearing to said radio source using said received signal;
a distance-estimator configured to estimate a distance to the radio source based on a time of flight for a signal received therefrom, which signal travels at known speed;
a calculating unit configured to calculate an estimated position of the radio source based on the estimated bearing and the estimated distance; and
a comparing unit adapted to determine a deviation value indicating deviation or coincidence between the alleged position of a vehicle according to the received positional data and the estimated position of the radio source,
wherein the signal carrying the positional data further comprises transmission time information indicating a point in time at which the signal was transmitted, and wherein the distance-estimator is configured to estimate the time of flight by establishing the point in time at which the signal was transmitted based on the transmission time information, and to determine an time elapsed between transmission and reception of the signal.

7. The vehicle surveillance system according to claim 6, further comprising:
a discriminator unit connected to at least one of an information module for informing a system user of surrounding vehicle traffic and to a decision and manoeuvring unit for controlling a vehicle in which the system is included, said discriminator unit being adapted to discard positional data indicating an alleged position of a vehicle which, according to the deviation value determined by the comparing unit, deviates substantially from the estimated position of the radio source from which the positional data was received.

8. The vehicle surveillance system according to claim 6, wherein said bearing-estimator comprises at least one directional antenna for receiving the signals carrying the positional data and a transceiver circuitry connected to said directional antenna for estimating the bearing to the radio sources from which the signals are received.

9. The vehicle surveillance system according to claim 6, wherein said signal is an automatic dependent surveillance-broadcast message.

10. The vehicle surveillance system according claim 6, wherein said vehicle surveillance system is located in an aircraft and used in an aircraft surveillance system for at least one of separation provision and collision avoidance applications.

11. A vehicle, comprising:
   a vehicle surveillance system for vehicle surveillance applications, wherein vehicles transmit positional data indicating their own position to surrounding vehicles, the vehicle surveillance system comprising:
   a bearing-estimator configured to receive a signal carrying positional data indicating an alleged position of a vehicle, transmitted from a radio source, said bearing-estimator further being configured to estimate a bearing to said radio source using said received signal;
   a distance-estimator configured to estimate a distance to the radio source based on a time of flight for a signal received therefrom, which signal travels at known speed;
   a calculating unit configured to calculate an estimated position of the radio source based on the estimated bearing and the estimated distance; and
   a comparing unit configured to determine a deviation value indicating a deviation or coincidence between the alleged position of a vehicle according to the received positional data and the estimated position of the radio source,
   wherein the signal carrying the positional data further comprises transmission time information indicating a point in time at which the signal was transmitted, and wherein the distance-estimator is configured to estimate the time of flight by establishing the point in time at which the signal was transmitted based on the transmission time information, and to determine an time elapsed between transmission and reception of the signal.

12. A ground-based air traffic control station for air traffic surveillance, the air traffic control station comprising:
   a vehicle surveillance system for vehicle surveillance applications, wherein vehicles transmit positional data indicating their own position to surrounding vehicles, the vehicle surveillance system comprising:
   a bearing-estimator configured to receive a signal carrying positional data indicating an alleged position of a vehicle, transmitted from a radio source, said bearing-estimator further being configured to estimate a bearing to said radio source using said received signal;
   a distance-estimator configured to estimate a distance to the radio source based on a time of flight for a signal received therefrom, which signal travels at known speed;
   a calculating unit configured to calculate an estimated position of the radio source based on the estimated bearing and the estimated distance; and
   a comparing unit configured to determine a deviation value indicating a deviation or coincidence between the alleged position of a vehicle according to the received positional data and the estimated position of the radio source,
   wherein the signal carrying the positional data further comprises transmission time information indicating a point in time at which the signal was transmitted, and wherein the distance-estimator is configured to estimate the time of flight by establishing the point in time at which the signal was transmitted based on the transmission time information, and to determine an time elapsed between transmission and reception of the signal.

* * * * *